Patented Apr. 3, 1934

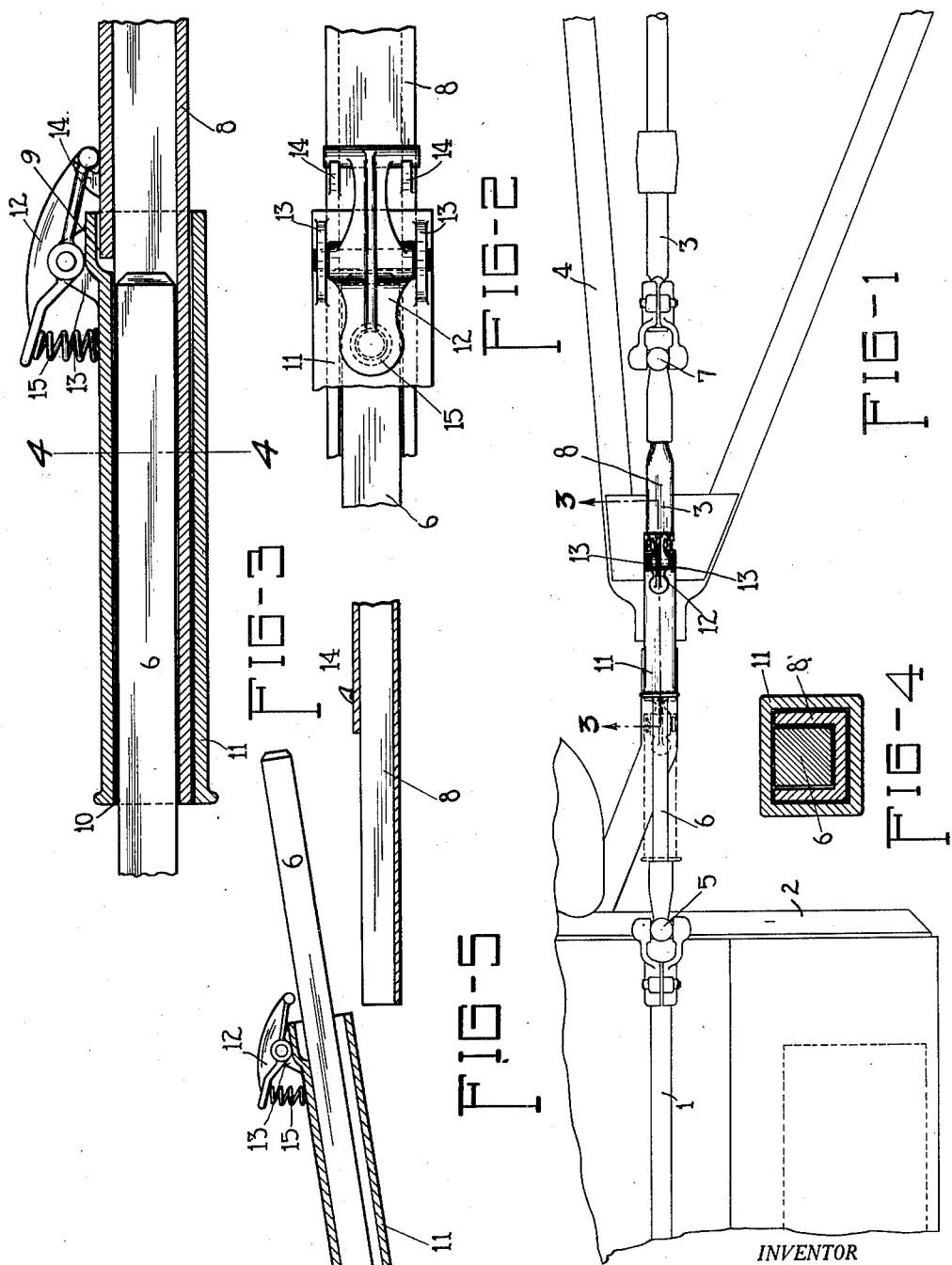

1,953,063

UNITED STATES PATENT OFFICE 1,953,063

DETACHABLE POWER TAKE-OFF

Wilbur J. Coultas, Moline, Ill., assignor to Deere & Company, Moline, Ill., a corporation of Illinois Application January 21, 1931, Serial No. 510,108

4 Claims. (Cl. 64—29)

My invention relates to that class of devices employed to transmit operating power from a tractor to a machine drawn thereby and embodying mechanism which it is desirable to actuate by means independent of the power produced by the drawn machine. An object of my invention is to provide a power take-off simple in construction and which can be readily secured together or separated.

In devices of this description the take-off of power from the tractor to a machine to be operated is accomplished by a flexible and telescopic device interposed between and connected, by universal joints, with a power shaft on the tractor and a driven shaft on the attached machine, the connection between the two shafts being of a type that to connect the power and driven shafts, the hitch of one machine to the other must be disconnected in order to join the parts of the device by which power is to be transmitted from the power shaft on the tractor to the driven shaft on the machine. Flexible and telescopic devices of such a type are well known and the difficulty in connecting the parts has created a demand for a simple and effective mechanism the parts of which can be easily joined together to connect the power shaft on the tractor with the driven shaft on the machine or to separate them irrespective of the relative positions of the tractor and the machine to be drawn, or if they be hitched together or not.

This demand I have satisfied by my invention as hereinafter described and claimed.

Referring to the drawing in which similar numerals indicate identical parts—

Figure 1 is a plan view, in outline, of part of a tractor and hitch device connecting the tractor with a machine to be drawn thereby, and illustrating my invention as connecting the power shafts of both machines;

Figure 2 is an enlarged detail plan view of the latching device;

Figure 3 is an enlarged longitudinal section on the line 3—3 of Figure 1;

Figure 4 is a section on the line 4—4 of Figure 3; and,

Figure 5 is a reduced detail view showing the parts of my invention disconnected to interrupt the transmission of power from the tractor to the machine being drawn.

The power shaft 1 is operated from the tractor 2, partly shown in outline, and the driven shaft 3 is connected to the operative mechanism of a machine to be drawn by the tractor which is attached thereto by a draft element 4, shown in outline. Connected to the shaft 1 by a universal joint 5 is a shaft 6, rectangular in cross section, and attached to the shaft 3, by a universal joint 7, is a tubular shaft 8 within which the shaft 6 is enclosed when the parts are connected for transmission of power. From 9 to 10 a side of the tubular shaft 8 is open, as shown in Figures 2, 3 and 4, so that the shaft 6 can be readily placed therein.

To hold the shaft 6 in the tubular shaft 8, and to facilitate its removal therefrom, I employ a coupling sleeve 11 slidable over the member 8 and held in place, when the parts are connected, by a latch device consisting of a rocking dog 12 pivotally mounted intermediate its length on and between lugs 13 on the rear end of the coupling sleeve 11. The rear end of the dog is T-shaped and adapted to engage with undercut faces of catches 14 on the tubular member 8. A coiled spring 15 is interposed between the forward end of the dog 12 and the coupling sleeve 11 and exerts its expansive force to hold the dog in operative position.

Presuming the tractor and machine to be drawn are in position, whether connected by a suitable hitch device or not, and it is desirable to connect the power shaft to the driven shaft on the machine, the coupling sleeve 11 is first placed on the shaft 6 to a position as shown in dotted lines in Figure 1, the shaft 6, pivoting on the universal joint 5, is lowered through the open side of the tubular shaft 8 until it is seated in the latter, the coupling sleeve 11 is then slid on the shaft 6 and over the tubular shaft 8 until the end of the dog 12 rises over the catches 14, by continued movement of the coupling sleeve, and engages with the undercut sides of the catches 14 where it is securely held by the expansive force of the spring 15.

To disconnect the shafts 1 and 3 pressure on the forward end of the dog 12 rocks the latter compressing the spring 15 and releasing the head of the dog from the catches 14, the coupling sleeve 11 is then moved along until it is at the position shown in dotted lines in Figure 1. This movement of the coupling sleeve uncovers the open side of the tubular shaft 8 so that the shaft 6, pivoting at the universal joint 5, can readily be removed from the tubular shaft 8, as illustrated in Figure 5, after which the coupling sleeve 11 can be removed from the shaft 6 until it is again needed to connect the shafts as heretofore explained. As shown in Figure 5 the shaft 6 is swung upwardly to release it from the tubular shaft 8, but it can be as readily removed and replaced irrespective of the position the tubular shaft may be in when the engine stops.

My invention is simple in construction and operation, the universal joints 5 and 7 providing for the flexibility necessary when the machines are steered in a new direction, the shaft 6 being free to move longitudinally in the tubular shaft 8 and the coupling sleeve 11 to accommodate itself to any movement of the tractor and drawn machine relative to each other.

What I claim is:—

1. In a telescoping power take-off, the combination of a tubular driven shaft polygonal in transverse section having a catch thereon and having an open side for part of its length, a driving shaft polygonal in transverse section and adapted to be connected with the driven shaft by placement through said open side, a sleeve on the driving shaft operable to cover said open side and hold the shafts together, and a dog on said sleeve engaging with the catch on the driven shaft to hold said sleeve from longitudinal movement when the shafts are connected, said dog disengageable to permit a longitudinal movement of said sleeve and disconnection of the shafts.

2. In a telescoping power take-off, the combination of a tubular shaft polygonal in transverse section and having an open side for at least part of its length, a second shaft polygonal in transverse section telescopically connected with said tubular shaft for relative longitudinal displacement and engageable with the tubular shaft through said side, and means to cover said open side and hold said shafts together meanwhile permitting relative longitudinal telescopic displacement of said shafts.

3. In a telescoping power take-off, the combination of a tubular driven shaft polygonal in transverse section and having an open side for part of its length, a driving shaft polygonal in transverse section telescopically connected with said driven shaft for relative longitudinal displacement and adapted to be connected with the driven shaft by placement through said open side, and means on one of said shafts operable to cover said open side and hold said shafts together meanwhile permitting relative longitudinal telescopic displacement of said shafts.

4. In a telescoping power take-off, the combination of a tubular driven shaft polygonal in transverse section and having an open side for part of its length, a driving shaft polygonal in transverse section telescopically connected with said driven shaft for relative longitudinal displacement and adapted to be connected with the driven shaft by placement through said open side, a sleeve on one of said shafts shiftable longitudinally to cover said open side and hold the shafts together meanwhile permitting relative longitudinal telescopic displacement of said shafts, and means on the other of said shafts cooperating with means on said sleeve to hold the latter from longitudinal movement when the shafts are connected.

WILBUR J. COULTAS.